(12) United States Patent
Mittal et al.

(10) Patent No.: US 10,873,618 B1
(45) Date of Patent: Dec. 22, 2020

(54) SYSTEM AND METHOD TO DYNAMICALLY GENERATE A SET OF API ENDPOINTS

(71) Applicant: Volterra, Inc., Santa Clara, CA (US)

(72) Inventors: Devesh Mittal, Bangalore (IN); Suhas P Bharadwaj, Bangalore (IN); Gilles Roudière, Sainte-Marie-Lapanouze (FR)

(73) Assignee: Volterra, Inc., Santa Clara, CA (US)

( * ) Notice: Subject to any disclaimer, the term of this patent is extended or adjusted under 35 U.S.C. 154(b) by 0 days.

(21) Appl. No.: 16/736,034

(22) Filed: Jan. 7, 2020

(51) Int. Cl.
| H04L 29/08 | (2006.01) |
| H04L 29/12 | (2006.01) |
| G06F 9/54  | (2006.01) |

(52) U.S. Cl.
CPC .............. H04L 67/02 (2013.01); G06F 9/547 (2013.01); H04L 61/15 (2013.01); H04L 61/6004 (2013.01)

(58) Field of Classification Search
CPC .......... H04L 67/02; H04L 61/15; G06F 9/547
See application file for complete search history.

(56) References Cited

U.S. PATENT DOCUMENTS

| 8,768,926 B2 * | 7/2014 | Tengli | G06F 16/7343 707/737 |
| 9,729,506 B2 * | 8/2017 | Call | H04L 63/02 |
| 9,882,957 B1 * | 1/2018 | Mostert | H04L 67/02 |
| 10,747,505 B1 * | 8/2020 | Lester | G06F 8/10 |
| 2008/0010291 A1 | 1/2008 | Poola et al. | |
| 2010/0211927 A1 * | 8/2010 | Cai | G06F 40/20 717/104 |
| 2014/0047413 A1 * | 2/2014 | Sheive | G06F 8/30 717/110 |
| 2016/0321255 A1 * | 11/2016 | Granacher | G06F 16/2386 |
| 2020/0233787 A1 * | 7/2020 | Battaglia | H04L 67/10 |

OTHER PUBLICATIONS

"What is Layer7? How Layer 7 of the Internet Works" Cloudflare, Nov. 26, 2019 URL:https://www.cloudflare.com/learning/ddos/what-is-layer-7/.
"Step 2: Endpoints and methods (API reference tutorial)" I'd Rather Be Writing, Nov. 26, 2019 URL:https://idratherbewriting.com/learnapidoc/doc.apis_resource_endpoints.html.

* cited by examiner

*Primary Examiner* — El Hadji M Sall
(74) *Attorney, Agent, or Firm* — Rimon Law (57) ABSTRACT

A method and system for generating a set of API Endpoints includes receiving network data requests to extract raw URL strings and http Methods therefrom, splitting the URL strings into component groups, and building a component tree. Dynamic components are detected and replaced with a generic designator. The component tree is then collapsed by merging identical branches into a single branch, thereby providing a set of API Endpoints. Detection of dynamic components can include determining that the number of child nodes paired with a parent node is relatively large; detecting that the number of occurrences of a parent node component is relatively high within a predetermined time in comparison to the number of occurrences of corresponding child node components; detecting a relatively high similarity of grandchild node components that share a parent node; and detecting child components having randomly generated character sequences.

19 Claims, 4 Drawing Sheets

SYSTEM AND METHOD TO DYNAMICALLY GENERATE A SET OF API ENDPOINTS

BACKGROUND OF THE INVENTION

Technical Field

The present application generally relates to Application Program Interfaces, or "APIs", for allowing two software programs to communicate with each other, and more particularly, to a system and method for generating a set of API Endpoints associated with a web application based upon network traffic targeting such web application.

State of the Art

Application Program Interfaces, or "APIs", are simply computer software code that allows two software programs to communicate with each other. APIs work by sending requests for information from a web application or web server and receiving a response. An API Endpoint is a point at which an API connects with the software program. In other words, API endpoints are specific digital locations where requests for information are sent by one program and where the corresponding resource may be accessed.

An API's performance depends on its capacity to successfully communicate with API endpoints. API Endpoints, usually defined as the unique tuple {URL, Method}, form the most basic unit of commands for most modern web applications. The URL represents the Uniform Resource Locator used to specify the location of a web resource on a computer network and a mechanism for retrieving it. A typical URL could have the form http://www.example.com/index.html, which indicates a protocol (http), a hostname (www.example.com), and a file name (index.html). The "Method" component refers to common http method requests like POST, GET, PUT, PATCH, and DELETE.

Learning the set of API Endpoints exposed by a web application merely from inspecting traffic has a huge range of applications like data profiling and user behavior profiling in web application firewalls. Additionally, this learned set of API Endpoints are of immense benefit as an app observability tool for system administrators. Once the set of API Endpoints is learned, it can be used to profile and create other useful information about the application like typical user behavior, etc., which can act like security and business intelligence insights to be consumed by business, security and site reliability engineering teams.

For example, such information has value for security purposes, such as: 1) "whitelisting" of known API Endpoints; 2) Profiling of known API Endpoints; 3) User behavior analysis using API Endpoint access sequences; and 4) Denial of Service (DoS) attack detection based on per API Endpoint access rates. Apart from security considerations, such information is also valuable relative to: 1) identifying the slowest API Endpoints; 2) identifying those API Endpoints that are most prone to errors; and 3) capacity planning.

Layer 7, or L7, refers to the top layer in the seven-layer OSI model of the Internet; it is also known as the "application layer". An application layer is an abstraction layer that specifies the shared communications protocols and interface methods used by hosts in a communications network. In the OSI model, the application layer serves as the user interface responsible for displaying received information to the user. By way of explanation, HTTP requests and responses used to load webpages are Layer 7 events.

So far, efforts to learn API Endpoints have been limited to direct set membership checks for {URL, Method} tuples. One problem with that is there can be dynamic components in the URL that would need to be mapped to the "any" or "*" operator of a regular expression ("regex"), i.e., a sequence of characters that define a search pattern, while matching the URL against a set of learned API Endpoints. Without having the ability to automatically identify these dynamic components, any {URL, Method} system would end up learning an exhaustive set of all unique URLs. This approach would result in learning duplicate URLs pointing to the same API Endpoint, resulting in an unmanageably large set of URLs.

For example, the web application hosted at www.reddit.com uses a unique ID, in the form of a seemingly random string, to identify a unique object. In the URL set forth below:

https://reddit.com/r/news/comments/8zo9or the characters "8zo9or" represent such a unique ID, or random string. Static properties related to such random string can appear later in the URL, as exemplified below:

https://reddit.com/r/news/comments/8zo9or/top/.

A web-based application might have thousands of such unique IDs embedded in its URLs. However, these thousands of unique IDs would not really contribute any useful information if they were treated as thousands of different API Endpoints; this is because the function performed at each such endpoint is the same.

SUMMARY OF THE INVENTION

It is therefore an object of the present invention to provide a system and method to generate a set of API Endpoints associated with a web application by inspecting network data traffic directed to such web application.

Another object of the present invention is to provide such a system and method to generate a set of API Endpoints which can be generated by examining network data traffic in real time.

Still another object of the present invention is to provide such a system and method to generate a set of API Endpoints which can alternatively be generated by examining offline access logs of network data traffic generated by a network server.

Yet another object of the present invention is to provide such a system and method to generate a set of API Endpoints which distinguishes between static components and dynamic components with high accuracy.

A further object of the present invention is to provide such a system and method to generate a set of API Endpoints which condenses similar URLs that differ from each other only with respect to dynamic components.

These and other objects of the present invention will become more apparent to those skilled in the art as the description of the present invention proceeds.

Briefly described, and in accordance with various embodiments thereof, a first aspect of the present invention relates to a method for generating a set of API Endpoints by inspecting network data traffic. Such method includes receiving a number of network data requests set forth in {URL, Method} format to identify command actions supported by a web application. The HTTP request headers of such received network data requests are inspected to extract raw URL strings therefrom. Each such raw URL string is split into a number of components. A raw component tree is assembled consisting of a number of branches formed of nodes, wherein each node is a component of at least one raw URL string. Such method analyzes each component in the raw component tree to determine whether such component is static or dynamic. The raw component tree is modified to replace components determined to be dynamic with a generic designator. The raw component tree is then collapsed to form a collapsed component tree by merging identical branches into a single branch. The API Endpoints are then derived from the collapsed component tree.

The received network data requests may be received in real time from data packets transmitted over a data network. Alternatively, the received network data requests may be received as an offline access log generated by a network server.

In various embodiments of such method, the manner of splitting each of the raw URL strings into a group of components includes detecting forward-slash characters "/" within the raw URL strings and deriving the components from groupings of characters separated by such forward-slash characters.

In some embodiments of such method, the derived set of API Endpoints consists of so-called "tuples" expressed in the form of {Collapsed URL, Method} wherein "Collapsed URL" signifies a URL string wherein dynamic components are replaced by a generic designator, and wherein "Method" signifies an http method request, such as POST, GET, PUT, PATCH, or DELETE.

In various embodiments of such method, the raw component tree includes at least one (but often more than one) "parent" node that includes a component located closer to the beginning of a raw URL string. In addition, the raw component tree includes at least one (but often more than one) "child" node that includes a component located further from the beginning of the raw URL string than the parent node. By way of example, in the raw URL string http://wafdemo.com/api/user/, the component "api" may be regarded as a "parent" node, while the component "user" may be regarded as a "child" node.

In some embodiments of such method, the process of determining whether a component is dynamic evaluates the number of "child" nodes that are paired with a particular "parent" node. Where the number of child nodes paired with a single parent node is relatively large, the child nodes are highly likely to be dynamic.

In some embodiments of such method, the process of determining whether a component is dynamic involves tracking the number of times that particular components appear within received network data requests over a predetermined period of time. The number of occurrences of a component of a parent node within such predetermined time is compared to the number of occurrences of corresponding child nodes associated with such parent node within such predetermined time. If the number of occurrences of a parent node component is relatively high, but the number of occurrences of each child node component is relatively low, then it is highly likely that the child components are dynamic.

In some embodiments of such method, the process of determining whether particular components are dynamic involves determining the similarity of grandchild node components (to each other) for child nodes that share the same parent node. In other words, focusing upon a particular parent node, its child nodes are located, and then for each such child node, sets of corresponding grandchild components are formed. For example, if parent node A has 3 child components X, Y, and Z, and if each of child components X, Y and Z has its own child node components (i.e., grandchildren of parent node A), then the logic element computes the similarity among the sets of X's children, Y's children, and Z's children. If a relatively high similarity is found to exist among these sets of grandchild components, then it is likely that the child node components X, Y and Z are dynamic. The computation of similarity among the sets of grandchild components may be accomplished using statistical techniques including, but not limited to, Jaccard-like similarity.

In some embodiments of such method, the process of determining whether particular components are dynamic involves detecting if child components that share the same parent node include character sequences that were randomly generated. As the likelihood that such child components were randomly generated increases, so does the likelihood that such child components are dynamic.

Various embodiments of the present invention provide a system for generating a set of API Endpoints associated with a web application by inspecting network data traffic. The system includes a server, such as a web server or proxy server, adapted to receive a number of network data requests that use {URL, Method} format to identify command actions supported by a web application. A logic element, which may be integral with, or separate from, the server inspects http request headers of received network data requests to extract raw URL strings therefrom. The logic element splits each of the raw URL strings into a number of components, and building a raw component tree consisting of a plurality of branches formed of nodes, wherein each node is a component of at least one raw URL string, said logic analyzing each component in the raw component tree to determine whether such component is static or dynamic, said logic modifying the raw component tree to replace components determined to be dynamic with a generic designator, and said logic creating a collapsed component tree by merging identical branches of the raw component tree into a single branch. The collapsed component tree provides the desired set of API Endpoints.

In some embodiments of such system, each raw URL string is split into a group of components by detecting forward-slash characters "/" within the raw URL strings and deriving the plurality of components from groupings of characters separated by such forward-slash characters.

In some embodiments of such system, the set of API Endpoints that are included in the collapsed component tree includes a number of tuples in the form of {Collapsed URL, Method} wherein the Collapsed URL signifies a URL in which dynamic components are replaced by a generic designator, and Method signifies an http method request.

In various embodiments of such system, the raw component tree includes at least one parent node having a component located closer to the beginning of the raw URL string, and at least one child node having a component located further from the beginning of the raw URL string than the parent node.

In some embodiments of such system, the logic element analyzes whether the number of child nodes paired with a particular parent node is relatively large. If the number of child nodes paired with a particular parent node is relatively large, then it is highly likely that such child node components are dynamic.

Some embodiments of such system include a storage for storing the number of times that particular components appear within received network data requests over a predetermined period of time. The logic element analyzes the number of occurrences of a parent node component within such predetermined time, and compares it to the number of occurrences of paired child node components associated with such parent node within such predetermined time. If the number of occurrences of a parent node component within such predetermined time is relatively high and the number of occurrences of each paired child node associated with such parent node within such predetermined time is relatively low, then it is highly likely that such paired child node components are dynamic.

In some embodiments of such system, the logic element detects whether particular child node components (which share the same parent node) are dynamic by determining the similarity of sets of corresponding grandchild node components to each other. In other words, focusing upon a particular parent node, its child nodes are located, and then for each such child node, sets of corresponding grandchild components are formed. For example, if parent node A has 3 child components X, Y, and Z, and if each of child components X, Y and Z has its own child node components (i.e., grandchildren of parent node A), then the logic element computes the similarity among the sets of X's children, Y's children, and Z's children. If a relatively high similarity is found to exist among these sets of grandchild components, then it is likely that the child node components X, Y and Z are dynamic. The computation of similarity among the sets of grandchild components may be accomplished using statistical techniques including, but not limited to, Jaccard-like similarity.

In some embodiment of such system, the logic element detects that child node components that share the same parent node have character sequences that were randomly generated. In such instances, such child node components are deemed to be dynamic.

It will be appreciated that the various techniques for detecting whether a particular child node component is static or dynamic may be combined. For example, a weighted average of such techniques can be computed and compared to a threshold value. If the weighted average equals or exceeds such threshold, then such component is deemed to be dynamic, and like URL strings are collapsed.

The foregoing and other features and advantages of the present invention will become more apparent from the following more detailed description of particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein:

DETAILED DESCRIPTION

The embodiments described herein involve the inspection of so-called "Layer 7" (L7) network data traffic to dynamically generate a set of API Endpoints that are exposed by a web application that uses {URL, Method} format to uniquely identify a command action supported by the web application. The API Endpoints are derived merely by inspecting HTTP request headers for requests that are known to have been successfully served by the application without any manual intervention or configuration. The method and system of the present invention successfully identifies dynamic components with high accuracy and results in a much more useful learned set of API Endpoints to be used for the purposes described above.

In an example discussed above, the web application hosted at www.reddit.com uses a unique ID, in the form of a seemingly random string, to identify a unique object. In the URL character string set forth below:

https://reddit.com/r/news/comments/8zo9or the characters "8zo9or" correspond to the unique ID, or random string. The properties related to such random string can appear later in the URL, as exemplified below:

https://reddit.com/r/news/comments/8zo9or/top/

A web-based application might have thousands of such unique IDs embedded in its URLs. However, these thousands of unique IDs do not really contribute any useful information, since the function performed at each such endpoint is the same. With regard to the above example, the abbreviated URL "reddit.com/r/news/comments/*" is a much more useful URL string when compared to the original URAL "reddit.com/r/news/comments/8zo9or/top/", for purposes of checking for an API Endpoint. The random string "8zo9or" is a dynamic part of the URL string. In accordance with the present invention, an API Endpoint mapper may take this into account by replacing this dynamic part of the URL with a predefined generic string, e.g., "DYN" or "*". Children directories of these dynamic parts of the URL (for example, the component "top" in the above example) might themselves be static, and should therefore be mapped to different API Endpoints.

Building upon the aforementioned example set forth above, let us suppose that the following URLs are associated with the reddit.com website:

1) https://reddit.com/r/news/comments/8zo9or/top/
2) https://reddit.com/r/news/comments/8zo9or/controversial
3) https://reddit.com/r/news/comments/8zo9or/new An API Endpoint mapper following the principles of the present invention would convert each such URL into a corresponding collapsed URL shown in the table below:

| Original URL | Collapsed URL |
| --- | --- |
| https://reddit.com/r/news/comments/8zo9or/top/ | https://reddit.com/r/news/comments/{DYN}/top/ |
| https://reddit.com/r/news/comments/8zo9or/controversial | https://reddit.com/r/news/comments/{DYN}/controversial |
| https://reddit.com/r/news/comments/8zo9or/new | https://reddit.com/r/news/comments/{DYN}/new |

URLs can be broken down into components by splitting the raw URL string using the forward-slash character "/". The resultant array of character strings are referred to herein as "components". For example, the URL "https://reddit.com/r/news/comments/8zo9or/top/" can be split into the following components: "r"; "news", "comments"; "8zo9or"; and "top". In this example, the component "8zo9or" is dynamic, while the other components are static. The present invention provides a highly accurate method of detecting the set of API Endpoints for websites that use URLs having dynamic URL components.

The system and method of the present invention receive, as inputs, raw URL strings that include L7 HTTP request headers using the {URL, Method} protocol, and provide, as an output, a listing of API Endpoints, each defined as the tuple {CollapsedURL, Method}. In this regard, the term "CollapsedURL" signifies a URL wherein dynamic component markers like the string "8zo9or" in the examples above are replaced by a generic placeholder, like "DYN".

Figure 1:
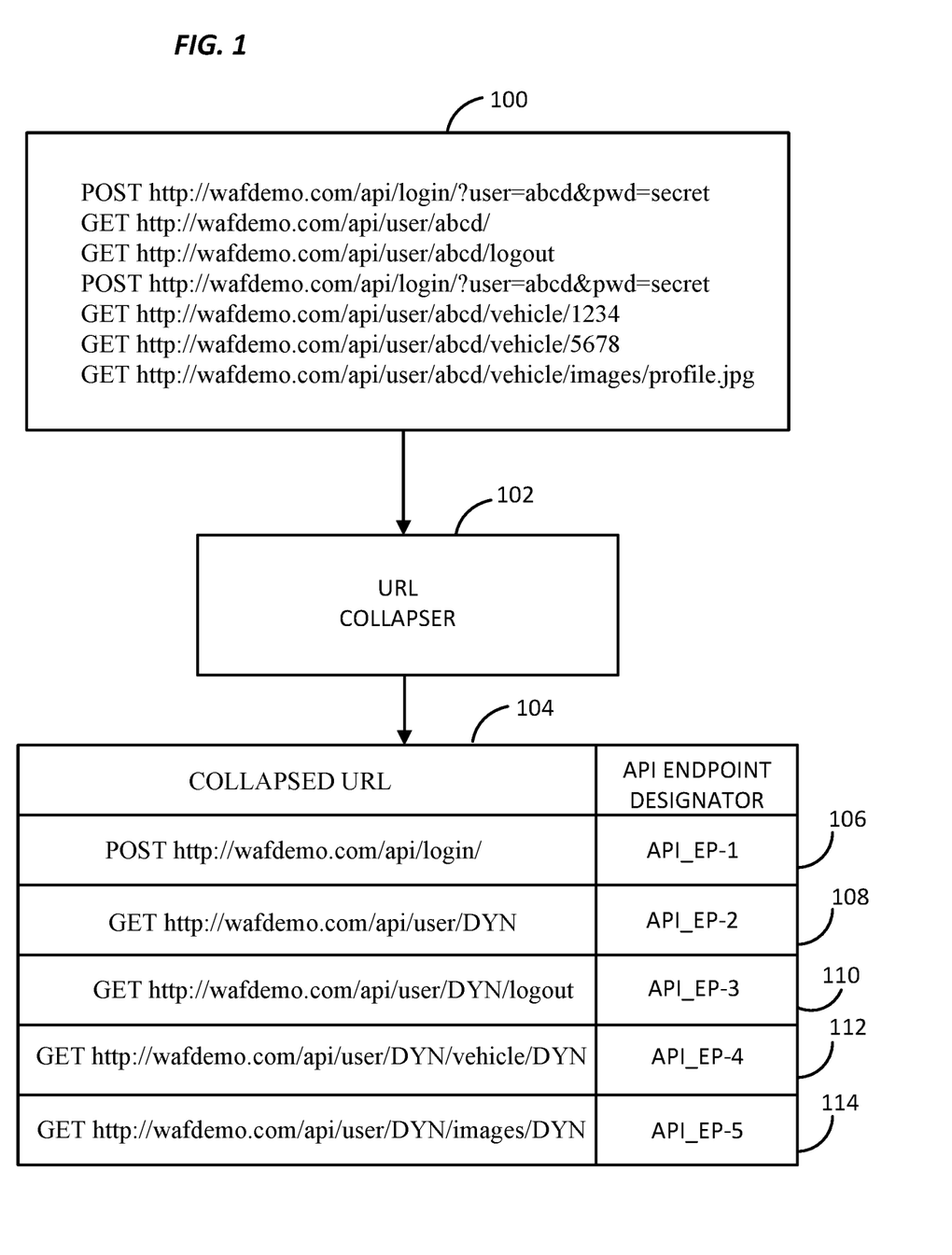
FIG. 1 is a high level flow diagram illustrating a series of network data requests that use {URL, Method} format to identify command actions supported by a web application, and the manner in which such URLs may be collapsed after detecting dynamic components.

FIG. 1 is a flow diagram that summarily illustrates input information, in the form of raw {URL, Method} "tuples", for a number of requests processed by a server, as well as the corresponding output information in the form of a list of unique {CollapsedURL, Method} tuples. The input requests shown in box 100 include the following:

POST http://wafdemo.com/api/login/?user=abcd&pwd=secret
GET http://wafdemo.com/api/user/abcd/
GET http://wafdemo.com/api/user/abcd/logout
POST http://wafdemo.com/api/login/?user=abcd&pwd=secret
GET http://wafdemo.com/api/user/abcd/vehicle/1234
GET http://wafdemo.com/api/user/abcd/vehicle/5678
GET http://wafdemo.com/api/user/abcd/vehicle/images/profile.jpg In FIG. 1, box 102 ("URL Collapser") conceptually represents the work performed in accordance with the method and system of the present invention. Box 104 shows the results of the collapsed URL requests after consolidating the dynamic components of the original raw URL strings into a set of five collapsed endpoints. In box 104 of FIG. 1, row 106 covers both of the original POST requests. Row 108 covers the GET request http://wafdemo.com/api/user/abcd/. Row 110 covers the GET request and http://wafdemo.com/api/user/abcd/logout. Row 112 covers the two GET requests that end in the dynamic strings "1234" and "5678". Finally, row 114 covers the final GET request, http://wafdemo.com/api/user/abcd/vehicle/images/profile.jpg.

To help explain the manner in which dynamic components are identified in each URL string, it is first helpful to understand the concepts of component tree structure and dynamic component properties. These concepts will now be described.

Component Tree Structure

Figure 2:
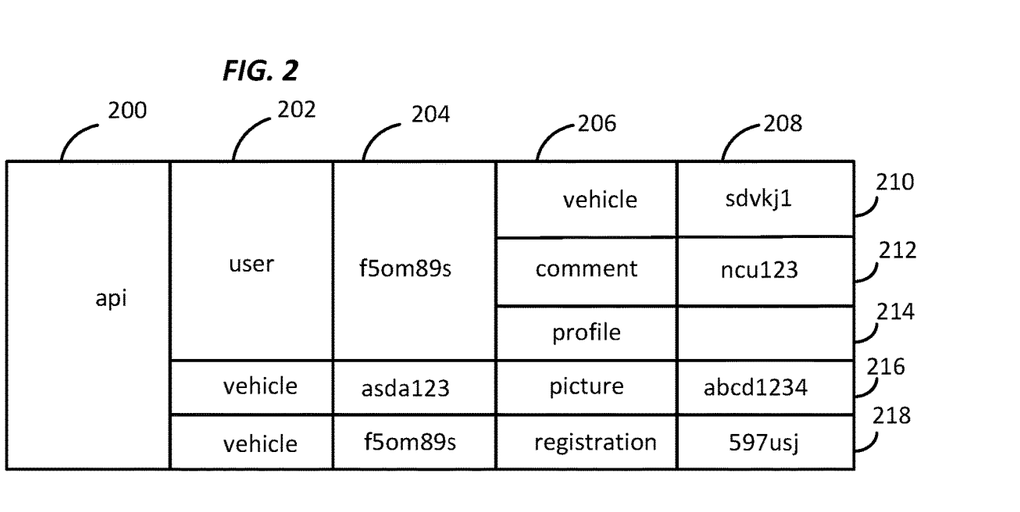
FIG. 2 is a chart illustrating how a set of URLs can be represented as a tree structure.

A set of URLs can be represented as a tree structure made up of nodes where each node is a component in at least one of the URLs in the set. FIG. 2 illustrates an example of such a tree structure. In FIG. 2, leftmost column 200 represents the parent node "api", which is the node closest to the "root" of the tree, and which, in this instance, is common to all URL strings represented by the tree. Column 208, on the right side of FIG. 2, represents the "leaves" of the tree that are furthest from the root of the tree. Column 202 includes three "child" nodes relative to parent node 200. The first child node "user" spans three rows 210, 212 and 214. The second child node "vehicle" is set forth in row 216. The third child node, also named "vehicle", is set forth in row 218. Column 204 can be regarded as "grandchild" nodes relative to parent node column 200. However, it will be appreciated that the term "parent node" can be applied, for example, to the entries in column 202, in which case the entries of column 204 may be regarded as "child" nodes relative to the components shown in column 204, and the entries of column 206 may be regarded as "grandchild" nodes thereof.

The leaves in the tree (i.e., the components in column 208) shown in FIG. 2 map to the following set of URLs:
1. /api/user/f5om89s/vehicle/sdvkj1
2. /api/user/f5om89s/comment/ncu123
3. /api/user/f5om89s/profile
4. /api/vehicle/asda123/picture/abcd1234
5. /api/vehicle/f50m89s/registration/597usj Dynamic Component Properties When a set of URLs are represented as a tree structure, as discussed with regard to FIG. 2, the identification of dynamic components is facilitated by the following set of rules:

1. The term "NumChildren" will be used herein to refer to the number of child nodes paired with a corresponding parent node. If NumChildren of a parent node is relatively large, then it is highly likely that the child-level of this parent node is dynamic.

2. The term "NumOccurrences" will be used herein to refer to the number of times, within a given period (say, within 24 hours), that a particular component appears within a request. If the NumOccurrences of a child component and its siblings is low, but the NumOccurrences for their respective parent component is high, then it is more likely that this child component and its siblings are dynamic.

3. In the world of statistical analysis, there is a tool known as the Jaccard similarity index (sometimes called the "Jaccard similarity coefficient") which compares the members of two sets of data to see which members are shared between the two sets, and which members are distinct. Thus, it is essentially a measure of the similarity of two sets of data, with a range from 0% to 100%; the higher the percentage, the more similar are the two sets being evaluated. If two grandchild node components (both sharing the same parent node) have a high Jaccard Similarity index, then it is more likely that the intermediate child node components are dynamic. Further specifics regarding use of the Jaccard similarity index are provided below. While Jaccard similarity is conventionally applied to two sets of data, the same concept may be applied to measure the similarity among three or more sets of data. As used herein, the term "Jaccard-like similarity" should be understood to refer to the application of conventional Jaccard similarity analysis applied to three or more sets of data.

4. Finally, if the various character sequences of a component and all its siblings, appear to be randomly generated, then it is likely that the component and its siblings are dynamic. The manner by which such random generation is detected is described in greater detail below.

Figure 3:
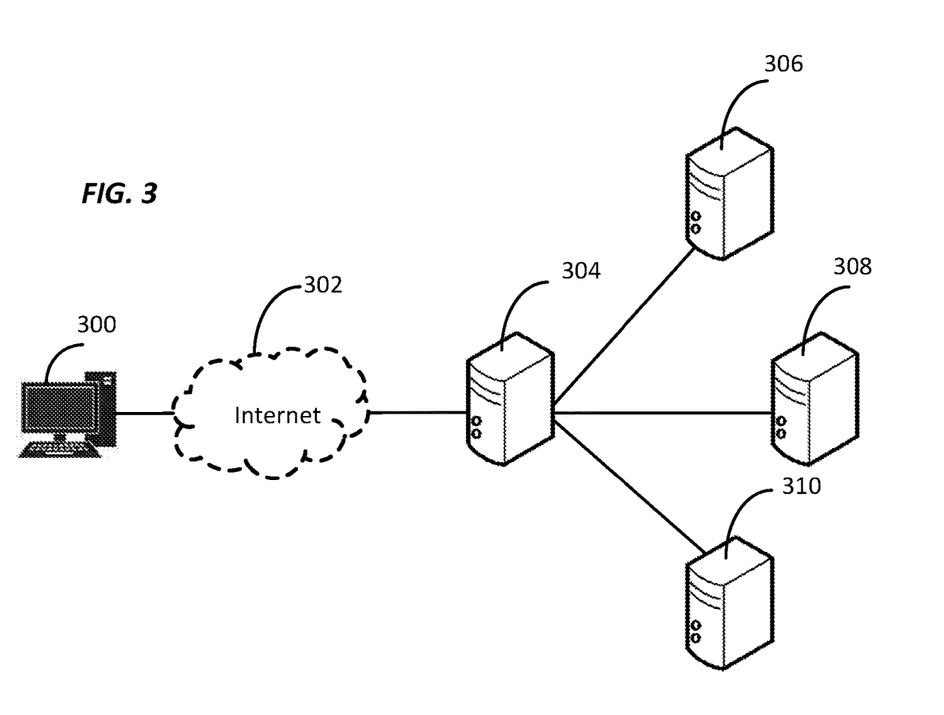
FIG. 3 is a high level diagram illustrating a client computer communicating over the Internet with a reverse proxy server which, in turn, communicates with three web application hosting servers.

Turning now to FIG. 3, a high level diagram of a typical proxy server deployment is shown. Client computer 300 is interconnected, via Internet 302, to proxy server 304. Proxy server 304 is, in turn, interconnected with three web application servers 306, 308 and 310. Proxy server 304 acts as a front-end for web applications and may optionally provide additional functionalities like load balancing, firewall protection, Bot detection, etc. Proxy server 304 receives all network data requests targeted toward web application servers 306, 308 and 310, and is able to inspect and extract the http headers for all requests that flow through proxy server 304. The method of the present invention may be performed within proxy server 304 or within a computer processor coupled thereto. Determination of API Endpoints within proxy server 304 can provide many benefits mentioned above, including data profiling and user behavior profiling, as well as serving as a useful tool for system administrators, and by security and site reliability engineering teams. As already noted, API Endpoint information has value for security purposes, such as: 1) "whitelisting" of known API Endpoints; 2) profiling of known API Endpoints; 3) user behavior analysis using API Endpoint access sequences; and 4) detecting attempted denial of service (DoS) attacks. Apart from security considerations, such API Endpoint information is also valuable for purposes of: 1) identifying the slowest API Endpoints; 2) identifying those API Endpoints that are most prone to errors; and 3) capacity planning.

Figure 4:
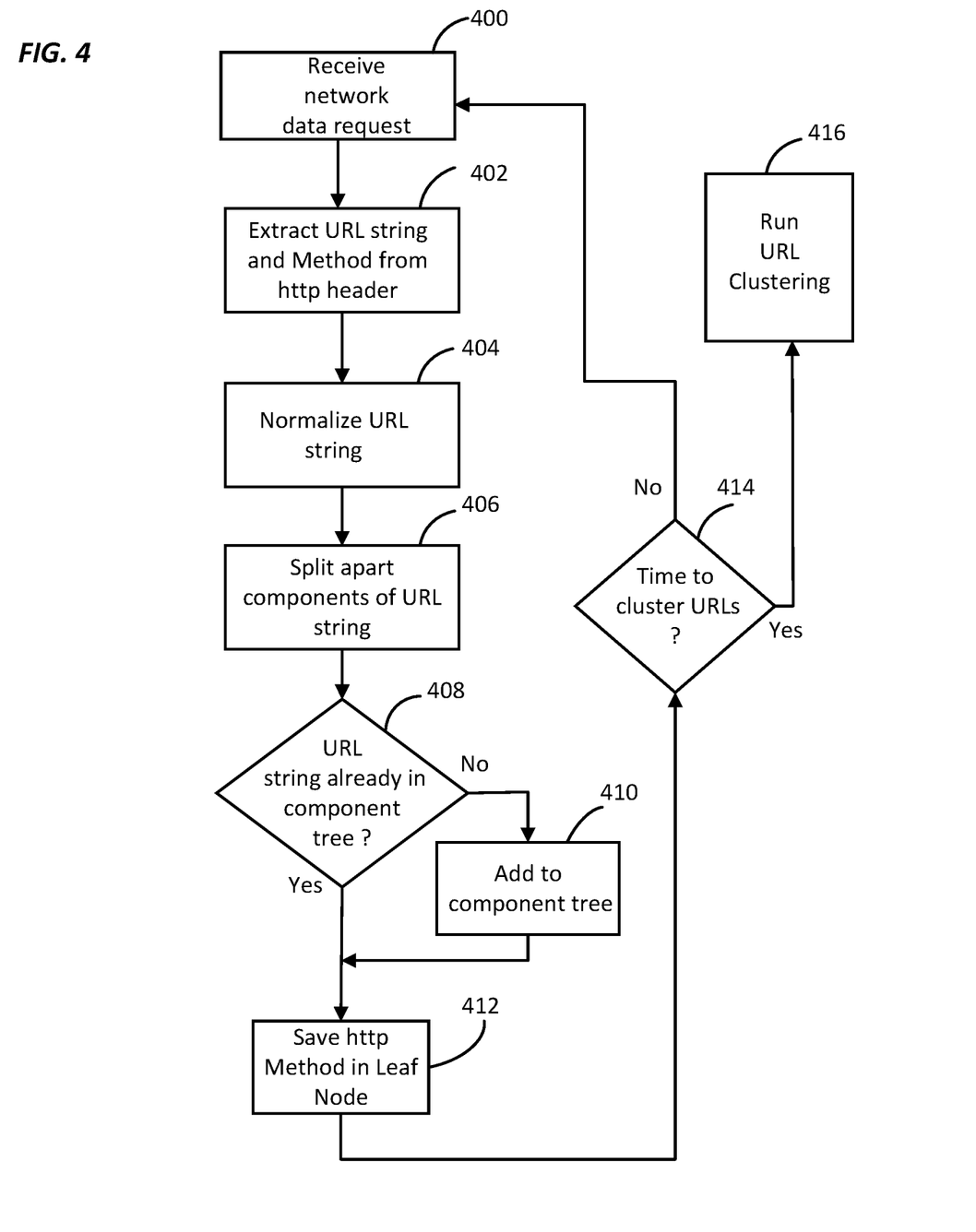
FIG. 4 is a flowchart that illustrates initial steps for processing http header request information obtained from each network data request.

The initial steps for processing http header request information is shown in the flowchart of FIG. 4. At step 400, the next network data request is received by proxy server 304. At step 402, the URL string and Method are extracted from the http header information. For example, if the header of the request includes the "tuple" {URL, Method} in the form of
GET http://wafdemo.com/api/user/abcd/,
then the URL string wafdemo.com/api/user/abcd/ is extracted, along with the Method "GET".

At step 404 of FIG. 4, the extracted URL string is "normalized" to remove any extra symbols and to resolve any path traversals. At step 406, the normalized URL string is split apart into its components by searching for the forward-slash character that separates such components; in the example above, the components are "api", "user" and "abcd". At step 408, it is determined whether the component tree table in which such URL strings are stored (see, for example, FIG. 2) already contains components arranged to form the current URL string; if not, the current combination of components is added to the component tree table, and control passes to step 412. If the current combination of components is already included in the component tree table, then control passes directly to step 412. At step 412, the "Method" extracted from the current request header (e.g., "GET") is saved in the form of metadata associated with the last, or "leaf" component node of the particular branch of the component tree to remember all Methods observed for a given URL string; in this regard, it will be recalled that API Endpoint identification includes a unique combination of URL and Method.

Still referring to FIG. 4, control passes from step 412 to decision step 414 to determine whether it is time to re-cluster the URL strings represented in the tree structure table. For example, one might decide to the re-cluster the entries in the tree component table for every ten (or alternatively, every hundred) insertions of new entries in such table. If the decision is "No", then control returns to step 400, and a new network data request is received. If the decision is "Yes", then a URL re-clustering process is performed in the manner described below. The logic for performing the steps described in FIG. 4 may be regarded as a "clustering module".

After the specified number of new component table insertions has been reached, the URL re-clustering process is performed. This process will now be described in conjunction with the flowchart of FIG. 5. Generally, the re-clustering process "walks" through the nodes of the URL component tree table and, at each node which has children, a determination is made whether that node's children are dynamic or not using the algorithm summarized in FIG. 5.

Figure 5:
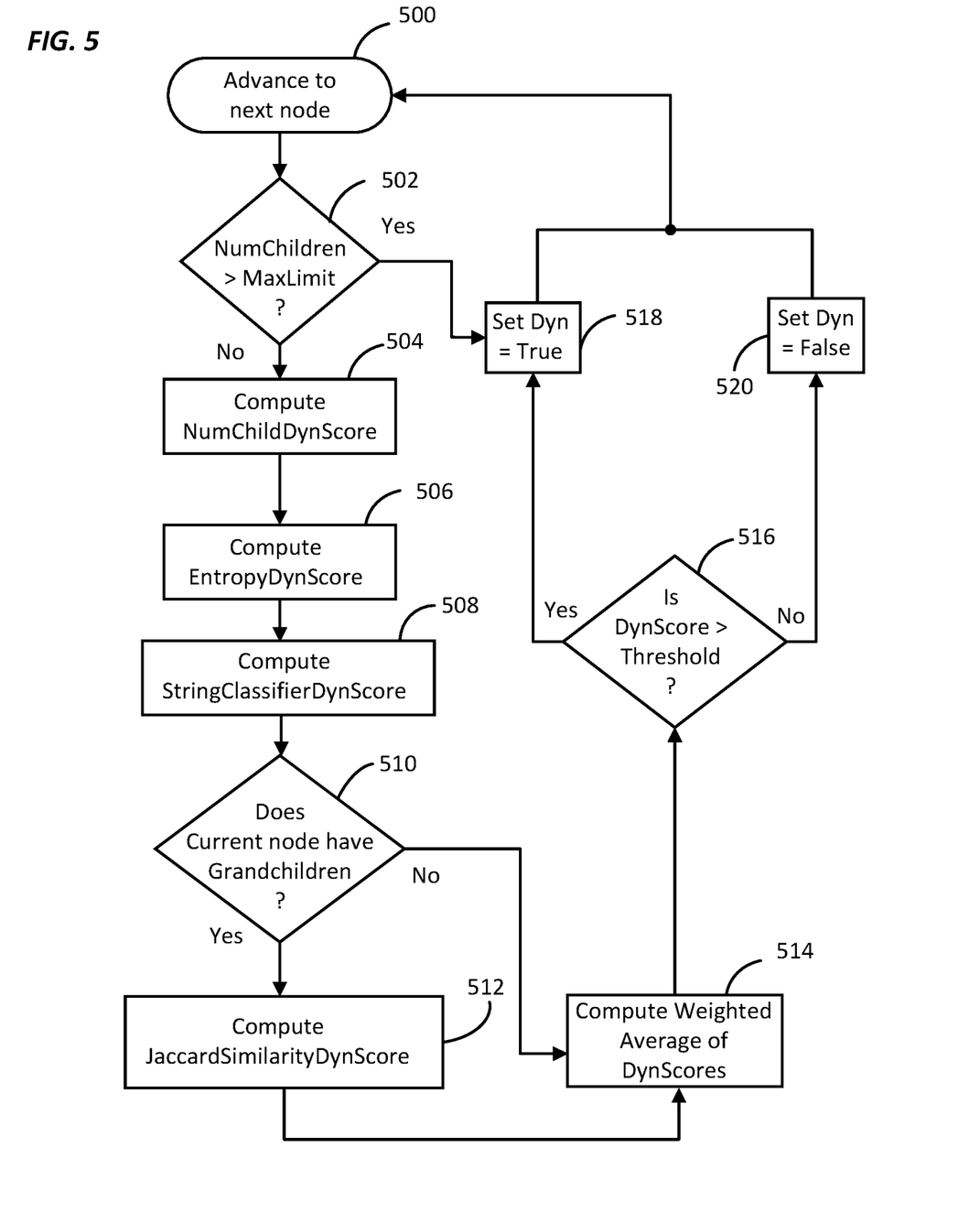
FIG. 5 is a flowchart that illustrates the steps performed to determine whether particular URL string components are dynamic or not dynamic in accordance with one embodiment of the present invention.

Referring now to FIG. 5, the process begins at step 500 by examining the first parent node in the tree structure table. At step 502, the number of child component nodes (NumChildren) is computed for the selected parent node. If NumChildren is greater than a specified number of children (MaxLimit), then control passes to block 518, and the child nodes are determined to be dynamic. This is because a parent node that has an exceptionally high number of children indicates that the child level of this parent node is dynamic.

If step 502 determines that NumChildren does not exceed MaxLimit, then control passes to step 504 for computation of a NumChildrenDynScore. Dynamic components tend to be much larger in number than non-dynamic components. To find parent nodes that have much larger number of child components than other nodes, a so-called Z-Score based method may be used. A "Z-score" (aka a "standard score") indicates how many standard deviations an element is from the mean. A z-score can be calculated as $z=(X-\mu)/\sigma$ where z is the z-score, X is the value of the element, $\mu$ is the population mean, and $\sigma$ is the standard deviation. For additional information, see "Statistics How To" at:
https://www.statisticshowto.datasciencecentral.com/probability-and-statistics/z-score/

When computing the Z-score, a NumChildMean and NumChildSTD (standard deviation) is calculated for each parent node in the tree. On visiting a node, the node's children are compared with other nodes in the tree using its Z-Score. The higher the Z-Score, the higher are the chances that the node is dynamic. After computing the mean value NumChildMean and standard deviation value NumChildSTD, the Z-score can be computed according to the formula:

Z-Score=(NumChild−NumChildMean)/NumChildSTD.

This Z-score is then used as the NumChildDynScore in step 504.

Control then passes to step 506 for computing an EntropyDynScore. The EntropyDynScore considers the number of occurrences over a predetermined period of time (e.g., in a set of access logs) of parent node components versus associated child node components. For example, in an earlier case shown in FIG. 1, two similar GET requests were set forth, namely,
GET http://wafdemo.com/api/user/abcd/vehicle/1234
GET http://wafdemo.com/api/user/abcd/vehicle/5678

If the parent node being analyzed is the static component "vehicle", and the dynamic child node components are "1234" and "5678", then the component "vehicle" will typically have a far greater number of occurrences per unit time than either "1234" or "5678". In addition, in a case where the child components are dynamic, it is more likely that the occurrences of such dynamic components per unit of time will be more evenly distributed (compared to each other) than for non-dynamic components. The degree to which the number of occurrences is evenly distributed among such child components can be gauged by measuring the entropy of the distribution of occurrences across such child components. The more equal the distribution of occurrences among the child nodes, the more likely it is that such child components are dynamic. Computation of the EntropyDynScore first requires computation of Entropy, along with mean values and standard deviation values for Entropy. Entropy can be calculated in accordance with the following formula:

$$H(X) = -\sum_{i=1}^{n} p_i \log_2 p_i$$

Where H(X) is a measure of the entropy for an event X with n possible outcomes and probabilities $p\_1, \ldots, p\_n$. Further details are provided at "Entropy is a measure of uncertainty", by Sebastian Kwiatkowski, *Toward Data Science*, Oct. 6, 2018, found at:

https://towardsdatascience.com/entropy-is-a-measure-of-uncertainty-e2c000301c2c.

After computing the Entropy for each child node, and computing the mean value EntropyMean and standard deviation value EntropyStd, the EntropyDyn score can be computed according to the formula:

EntropyDynScore=[(NumAccess/NumChild)−EntropyMean]/EntropyStd wherein NumAccess is the number of times a URL with a particular parent node component was accessed (i.e., the number of occurrences of this parent node component in network traffic within a predetermined time); and NumChild is the number of different child node components associated with such particular parent node.

Still referring to FIG. 5, control then passes from step 506 to step 508 4 for computation of a StringClassifierDynScore. Typically, dynamic components of URL path strings are randomly-generated strings of characters and/or integers. A so-called RNN LSTM based string classifier may be used to classify the text of child node components to predict if they are dynamic components or not. RNN LSTM is a deep neural networks-based technique to train classifiers, and which can thereafter classify a string of characters after being trained with large corpus of labeled training samples. In the present case, a two-class set of training data, labeled as either "dynamic" or "not dynamic", is used to train the classifier. The trained classifier then processes the string of characters that makes up a child component (and all of its siblings) to determine if they are dynamic or not dynamic. Further details regarding RNN LSTM classifiers are provided at "Understanding LSTM Networks", *Colah's Blog*, posted Aug. 27, 2015, at:

https://colah.github.io/posts/2015-08-Understanding-LSTMs/ and "The Unreasonable Effectiveness of Recurrent Neural Networks", Andrej Karpathy Blog, posted May 21, 2015, at:

http://karpathy.github.io/2015/05/21/rnn-effectiveness/

Such string classifiers render predictions by providing a score between the values 0 and 1, with "0" being non-dynamic and "1" being dynamic. The string classifier is run on all child node character strings. Then the value NumDynChildNodes is computed wherein NumDynChildNodes equals the total number of child nodes wherein the string classifier prediction score is greater than 0.95. Next, an average is calculated to get the average score for all child nodes of a particular parent node, as set forth below:

StringClassifiedDynScore=NumDynChildNodes/NumChild

Where NumChild is the number of child nodes associated with the parent node under study. The average computed above is used as the StringClassifiedDynScore.

Control then passes from step 508 to decision diamond 510 to determine whether, for a given parent node under study, its child nodes have child nodes of their own, i.e., the parent node under study has grandchild nodes. If there are no grandchild components, then step 512 is bypassed. If there are grandchild components, then control passes to step 512 for computing a JaccardSimilarityDynScore. The theoretical basis for step 512 is that, where a set of child nodes are dynamic, the grandchildren components of that set of child nodes will typically be very similar to each other. Accordingly, for each child node associated with a parent node under study, a set of grandchild component character strings is compiled. A Jaccard-like similarity index is then computed comparing the similarity (or non-similarity) of the sets of grandchild component strings associated with such child nodes; a relatively high Jaccard-like similarity index indicates that the intermediate child nodes, located intermediate the parent node and the grandchild nodes, are dynamic.

The Jaccard similarity index can be expressed, when comparing two sets of data, as a formula as set forth below:

Jaccard Similarity index=[*NB/TM*]×100, wherein NB is the number of data members that appear in both data sets being compared; wherein TM is the total number of distinct data members that appear in either, or both, of such data sets being compared; and wherein the result is expressed as a percentage. This resulting percentage indicates how similar (or how different) the two data sets are to each other. For example, if two data sets, each containing 100 members, were identical to each other, then NB=100, TM=100, and the result=100%. As another example, if two data sets, each containing 100 members, had no members in common, then NB=0, TM=200, and the result=0%. As a final example, if two data sets each contain 100 members, and 50 members appeared within both data sets, then NB=50, TM=150 (i.e., 50 unique members in the first data set, 50 unique members in the second data set, and 50 common members shared by both data sets), and the result is 33.3. Once again, the higher the resulting percentage, the more similar are the two data sets to each other. Although this example uses two sets of data, the same concept may be applied to can be extended to three or more sets of data, and such application is termed Jaccard-like similarity herein. While Jaccard similarity is one type of statistical tool that may be used to compare the similarities and differences as between sets of data, other comparison tools known to those skilled in the art may also be used.

Still referring to step 512 of FIG. 5, a JaccardSimilarityDynScore is computed covering all grandchildren components of each parent node according to the following formula:

(Intersection of all grandchildren components)/
(Union of all grandchildren components).

The result of the expression above is used as the JaccardSimilarityDynScore for the children of the parent node under study. The higher the JaccardSimilarityDynScore for a particular parent node under study, the more likely it is that the child node components are dynamic.

Control then passes to step 514 where a weighted average, called "DynScore", is calculated and compared to a threshold to determine that the node's children are dynamic components, and hence, that such child nodes should be collapsed with a sub-tree merge operation. The DynScore can be expressed as follows:

DynScore=*W*1×NumChildDynScore+*W*2×EntropyDynScore+*W*3×StringClassifierDynScore+*W*4×JaccardSimilarityDynScore, where W1, W2, W3 and W4 are weighting factors used to scale the individual scores to be comparable to each other. At step 516, the overall DynScore is compared to a threshold value, and if the DynScore exceeds the threshold value, then the group of child components under evaluation is deemed to be dynamic; if not, then the group of child components under evaluation is deemed not to be dynamic. Control passes back to step 500, and the next node in the tree structure table is evaluated in the same manner.

In the embodiment described in FIG. 5, the DynScore is affected by each of the four component scores described above, and in combination, such component scores collectively provide a highly reliable indication of nodes being either dynamic or not dynamic. However, those skilled in the art will appreciate that one or more of such component scores may be omitted while continuing to accurately predict whether component nodes are dynamic or not dynamic.

If a parent node's children are determined to be dynamic, then a node collapse operation is performed within the node tree structure table such that all sub-trees of this node's child nodes are merged into a single sub-tree, and the dynamic node of this single sub-tree is assigned a generic designator, e.g., "DYN". This has the effect of replacing a number of child node sub-trees with a single dynamic component child node sub-tree. After the tree collapse operations are completed, the path to each leaf node represents a collapsed URL. At this leaf node, more metadata about this collapsed URL is stored, including the HTTP Method combinations associated with the collapsed URL string. The resulting component tree table provides the set of learned API Endpoints as identified by the resulting {CollapsedURL, Method} combinations.

The resulting set of API Endpoints provides a wealth of information that may be used to profile data usage, user behavior, provide security information, aid in preventing malevolent threats, detect errors associated with web applications and facilitate capacity planning.

Computing systems referred to herein, including without limitation proxy servers, can comprise an integrated circuit, a microprocessor, a personal computer, a server, a distributed computing system, a communication device, a network device, a firewall, a proxy server, a web server, an application gateway, a stateful connection manager, and/or various combinations of the same. Processors referred to herein can comprise microprocessors, for example. Chipsets referred to herein can comprise one or more integrated circuits, and memories and storage referred to herein can comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. As such, it will be appreciated that the various examples of logic noted above can comprise hardware, firmware, or software stored on a computer-readable medium, or combinations thereof.

As used herein, the term "logic" or "logic element" may refer to a server or to a separate computing system coupled with a server. Such logic may include a computer processor, associated storage, and associated input and output ports. The various examples of logic noted herein can comprise hardware, firmware, or software stored on a computer-readable medium, or combinations thereof. This logic may be implemented in an electronic device to produce a special purpose computing system. Computer-implemented steps of the methods noted herein can comprise a set of instructions stored on a computer-readable medium that when executed cause the computing system to perform the steps. A computer-readable medium, as used herein, refers only to non-transitory media, does not encompass transitory forms of signal transmission, and expressly excludes paper.

A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data. Claims directed to methods herein are expressly limited to computer implemented embodiments thereof and expressly do not cover embodiments that can be performed purely mentally.

The absence of the term "means" from any claim should be understood as excluding that claim from being interpreted under Section 112(f) of the Patent Laws. As used in the claims of this application, "configured to" and "configured for" are not intended to invoke Section 112(f) of the Patent Laws.

Several embodiments are specifically illustrated and/or described herein to exemplify particular applications of the invention. These descriptions and drawings should not be considered in a limiting sense, as it is understood that the present invention is in no way limited to only the disclosed embodiments. It will be appreciated that various modifications or adaptations of the methods and or specific structures described herein may become apparent to those skilled in the art. All such modifications, adaptations, or variations are considered to be within the spirit and scope of the present invention, and within the scope of the appended claims.

We claim:

1. A method for generating a set of API Endpoints by inspecting network data traffic, comprising the steps of:
    receiving a plurality of network data requests that use {URL, Method} format to identify command actions supported by a web application;
    inspecting HTTP request headers of the plurality of received network data requests to extract raw URL strings therefrom;
    splitting each of the raw URL strings into a plurality of components;
    building a raw component tree consisting of a plurality of branches formed of nodes, wherein each node is a component of at least one raw URL string;
    analyzing each component in the raw component tree to determine whether such component is static or dynamic;
    modifying the raw component tree to replace components determined to be dynamic with a generic designator;
    collapsing the raw component tree into a collapsed component tree by merging identical branches into a single branch; and
    deriving a set of API Endpoints from the collapsed component tree.

2. The method recited by claim 1 wherein the plurality of network data requests are received in real time from data packets transmitted over a network.

3. The method recited by claim 1 wherein the plurality of network data requests are received as an offline access log generated by a network server.

4. The method recited by claim 1 wherein the step of splitting each of the raw URL strings into a plurality of components includes the step of detecting forward-slash characters "/" within the raw URL strings and deriving the plurality of components from groupings of characters separated by such forward-slash characters.

5. The method recited by claim 1 wherein the derived set of API Endpoints includes a plurality of tuples in the form of {Collapsed URL, Method} wherein the Collapsed URL signifies a URL wherein dynamic components are replaced by a generic designator, and Method signifies an http method request.

6. The method recited by claim 1 wherein the raw component tree includes at least one parent node that includes a component located closer to a beginning of a raw URL string, and wherein the raw component tree includes at least one child node that includes a component located further from the beginning of the raw URL string than the parent node.

7. The method recited by claim 6 wherein the step of analyzing each component in the raw component tree to determine whether such component is dynamic includes the step of determining whether the number of child nodes paired with a parent node is relatively large.

8. The method recited by claim 6 including the further step of tracking the number of times that particular components appear within received network data requests over a predetermined period of time, and wherein the step of analyzing each component in the raw component tree to determine whether such component is dynamic includes the step of detecting that the number of occurrences of a component of a parent node is relatively high within such predetermined time, while the number of occurrences of corresponding child nodes associated with such parent node is relatively low.

9. The method recited by claim 6 wherein the step of analyzing each component in the raw component tree to determine whether such component is dynamic includes the step of detecting whether a relatively high similarity exists for components of grandchild nodes that share the same parent node, and determining that intermediate child node components are dynamic when such relatively high similarity is found.

10. The method recited by claim 1 wherein the step of analyzing each component in the raw component tree to determine whether such component is dynamic includes the step of detecting if child components that share the same parent node include character sequences that were randomly generated.

11. A system for generating a set of API Endpoints by inspecting network data traffic, the system comprising in combination:
a server receiving a plurality of network data requests that use {URL, Method} format to identify command actions supported by a web application;
logic inspecting HTTP request headers of the plurality of received network data requests to extract raw URL strings therefrom, said logic splitting each of the raw URL strings into a plurality of components, and building a raw component tree consisting of a plurality of branches formed of nodes, wherein each node is a component of at least one raw URL string, said logic analyzing each component in the raw component tree to determine whether such component is static or dynamic, said logic modifying the raw component tree to replace components determined to be dynamic with a generic designator, and said logic creating a collapsed component tree by merging identical branches of the raw component tree into a single branch;
wherein the collapsed component tree provides a set of API Endpoints.

12. The system recited by claim 11 wherein said logic is included within the server.

13. The system recited by claim 11 wherein said logic splits each of the raw URL strings into a plurality of components by detecting forward-slash characters "/" within the raw URL strings and deriving the plurality of components from groupings of characters separated by such forward-slash characters.

14. The system recited by claim 11 wherein the set of API Endpoints included in the collapsed component tree includes a plurality of tuples in the form of {Collapsed URL, Method} wherein the Collapsed URL signifies a URL wherein dynamic components are replaced by a generic designator, and Method signifies an http method request.

15. The system recited by claim 11 wherein the raw component tree includes at least one parent node that includes a component located closer to a beginning of a raw URL string, and wherein the raw component tree includes at least one child node that includes a component located further from the beginning of the raw URL string than the parent node.

16. The system recited by claim 15 wherein said logic analyzes whether the number of child nodes paired with a parent node is relatively large when determining whether a component in the raw component tree is dynamic.

17. The system recited by claim 15 including a storage for storing the number of times that particular components appear within received network data requests over a predetermined period of time, and wherein said logic analyzes the number of occurrences of a component of a parent node within such predetermined time, and analyzes the number of occurrences of corresponding child nodes associated with such parent node within such predetermined time, and said logic determines that a child node component is dynamic if the number of occurrences of a component of a parent node within such predetermined time is relatively high and the number of occurrences of corresponding child nodes associated with such parent node within such predetermined time is relatively low.

18. The system recited by claim 15 wherein said logic detects whether a relatively high similarity exists for components of grandchild nodes that share the same parent node, and determines that intermediate child node components are dynamic when such relatively high similarity is found.

19. The system recited by claim 15 wherein said logic detects child components that share the same parent node and that also include character sequences that were randomly generated to determine that such child components are dynamic.

* * * * *